(12) United States Patent
Mullet

(10) Patent No.: US 6,915,573 B2
(45) Date of Patent: Jul. 12, 2005

(54) METHOD OF MANUFACTURING A SECTIONAL DOOR PANEL USING A COMBINATION OF QUICK-SETTING AND STRUCTURAL ADHESIVES

(75) Inventor: Willis J. Mullet, Gulf Breeze, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 10/341,103

(22) Filed: Jan. 13, 2003

(65) Prior Publication Data

US 2004/0134149 A1 Jul. 15, 2004

(51) Int. Cl.$^7$ .............................. B21D 47/00; C09J 5/04
(52) U.S. Cl. .................. 29/897.32; 156/314; 160/229.1
(58) Field of Search ...................... 29/897.32; 156/314; 160/201, 229.1

(56) References Cited

U.S. PATENT DOCUMENTS

| | | | |
|---|---|---|---|
| 4,051,286 A | 9/1977 | Abbott | 428/77 |
| 4,826,239 A | * 5/1989 | Nishikawa et al. | 296/218 |
| 5,016,700 A | 5/1991 | Wegner et al. | 160/232 |
| 5,177,868 A | 1/1993 | Kyle et al. | 29/897.32 |
| 5,445,208 A | 8/1995 | Shaner et al. | 160/232 |
| 5,552,006 A | * 9/1996 | Soliday et al. | 156/314 |
| 5,555,923 A | 9/1996 | Leist et al. | 160/229.1 |
| 5,568,713 A | * 10/1996 | Gagne et al. | 156/314 |
| 6,148,896 A | 11/2000 | Pinto et al. | 160/229.1 |
| 6,447,631 B1 | 9/2002 | Schahl et al. | 156/304.1 |

FOREIGN PATENT DOCUMENTS

| | | | |
|---|---|---|---|
| DE | 3518947 A1 | 5/1985 | C09J/5/06 |
| EP | 1 158 133 A2 | 2/2001 | E06B/9/15 |

* cited by examiner

*Primary Examiner*—David P. Bryant
(74) *Attorney, Agent, or Firm*—Renner, Kenner, Grieve, Bobak, Taylor & Weber

(57) ABSTRACT

A sectional door (10) and an assembly method for attaching a component (40, 41, 90) to a panel (11) of the sectional door (10) including the steps of fabricating a panel (11) for the sectional door (10), preparing a component (40, 41, 90) for attachment to the panel (11), dispensing a first adhesive (71, 72) on a surface where the panel (11) and the component (40, 41, 90) are to be joined, locating the panel (11) and the component (40, 41, 90) in a predetermined relative attachment position, and dispensing a second adhesive (71, 72) along at least one surface where the panel (11) and the component (40, 41, 90) abut. The sectional door (10) according to the assembly method includes a panel (11) having at least one side with at least a portion being a substantially planar surface (12, 13), a component (40, 41, 90) having at least one engaging surface (65, 66, 87, 88, 91) joined to the planar surface (12, 13), a first adhesive (71, 72) interposed between the planar surface (12, 13) and the engaging surface (65, 66, 87, 88, 91), and a second adhesive (71, 72) disposed along an edge of the engaging surface (65, 66, 87, 88, 91) and the planar surface (12, 13), whereby the second adhesive (71, 72) effects a seal between the panel (11) and the component (40, 41, 90) and imparts structural strength of the component (40, 41, 90) to the panel (11).

8 Claims, 7 Drawing Sheets

# METHOD OF MANUFACTURING A SECTIONAL DOOR PANEL USING A COMBINATION OF QUICK-SETTING AND STRUCTURAL ADHESIVES

TECHNICAL FIELD

The present invention relates generally to sectional door panels and a method of attaching components thereto. More specifically, the present invention relates to a method of attaching components to sectional door panels using two separate adhesives. More particularly, the present invention relates to a method of attaching components to sectional door panels where a first adhesive is used to establish initial positioning of the components, and a second different adhesive is used to provide a permanent bond between the door panels and components to enable the components to add structural rigidity to the door panels.

BACKGROUND ART

Sectional doors have long been employed in both residential structures, and commercial and industrial buildings. Sectional doors save space by retracting above, rather than into, the space they enclose. Originally, the panels of sectional doors were made of wood. However, over time, exposure to the outdoor environment causes wooden panels to rot, splinter, crack, and split. As an alternative to wooden panels, sectional doors with panels made of metal, such as steel or aluminum, have become commonplace. These metal panels have many advantages. For example, when insulation is sandwiched between two metal facers, the resulting panels have superior thermal properties as compared with wooden panels. Furthermore, metal panels are lighter than wooden panels. The savings in weight allows smaller motorized door openers to be used thus decreasing the amount of energy required to open and close the door. However, the thinner gauge metals currently being used for door panels make it desirable to use additional components for reinforcement and structural rigidity. These structural reinforcing components are attached to either the interior or exterior surfaces of the door panels, and allow the sectional doors to withstand adverse weather conditions like high winds, while, at the same time, maintaining weight savings and environmental resistance characteristics over wooden panels.

In the past, structural reinforcing components of sectional doors were fastened to the metal door panels using mechanical fasteners such as screws and rivets. Ideally, the interface between the door panels and the structural reinforcing components should be sufficiently rigid to enable the structural reinforcing components to enhance the overall strength of the door panels.

The use of thinner gauges of metal, however, prohibits a rigid interface without using a great number of mechanical fasteners. For example, the structural reinforcing components are attached to the door panels by mechanical fasteners at various spaced intervals. At these connection points, the mechanical fasteners transfer forces (i.e. high winds) from the door panels to the structural reinforcing components. However, the forces imparted to the door panels are effectively concentrated at these connection points. The concentration of force has a tendency to cause the thinner gauges of metals to warp at these connection points. Such warping can cause the door panel to eventually "tear" thereby destroying the interface between the door panels and structural reinforcing components. Nevertheless, the forces imparted to each point of connection can be decreased by increasing the number of fasteners and corresponding connection points. However, increasing the number of connection points also increases the complexity and the cost of manufacturing sectional doors. Furthermore, some metal fasteners have a tendency to deteriorate with exposure to the elements. Such deterioration can also destroy the interface between the doors panels and the structural reinforcing components.

As an alternative to mechanical fasteners, adhesives have been used to attach structural reinforcing components to door panels. Unlike attachment via mechanical fasteners, adhesives may provide a more uniform interface between the door panels and structural reinforcing components. Therefore, the forces imparted to the door panels, instead of being concentrated at the connection points of mechanical fasteners, are spread over the entire interface between the door panels and structural reinforcing components. As a result, the possibility of warping or tearing the doors panels is significantly decreased.

The use of adhesives, however, creates another set of problems. For example, quick setting adhesives such as hot melts have been used to provide a bond between door panels and structural reinforcing components. However, with quick setting adhesives, there is little structural strength imparted to the panels and there is a loss of adhesion when the doors are exposed to the elevated ambient temperatures existing in hotter climates. Consequently, high-speed assembly using quick setting adhesives has been possible, but the use of such adhesives in hotter climates has been restricted.

As an alterative to quick setting adhesives, slow setting structural adhesives have been used. These structural adhesives generally do not deteriorate in elevated temperatures, but they are slow setting, and can take up to a week to achieve their desired strength. During this curing period, the door panels cannot be handled roughly, let alone shipped and installed. Consequently, high-speed assembly using structural adhesives has been difficult. In some instances a combination of fasteners and adhesives has been employed to attach structural reinforcing components. However, the cost, labor to install and possible deterioration of fasteners remain as significant disadvantages. Therefore, existing ways of attaching structural reinforcing components to door panels, whether using mechanical fasteners, quick setting adhesives, or structural adhesives, suffer one or more disadvantages.

DISCLOSURE OF THE INVENTION

Therefore, an object of the present invention is to provide a method of attachment of structural reinforcing components to the interior and/or exterior surfaces of door panels without the need for mechanical fasteners. Another object of the present invention is to provide such a method of attachment where high-speed assembly techniques can be used to attach the structural reinforcing components to the door panels. Yet another object of the present invention is to provide a method of attachment where the application of adhesives can be automated. A further object of the present invention is provide such a method of attachment where the door panels with attached structural reinforcing components can be handled roughly, shipped and installed soon after assembly.

Still another object of the present invention is to provide a method of adhesive attachment of structural reinforcing components to door panels allowing the structural reinforcing components to enhance the overall structural strength of the door sections. Yet another object of the present invention is to provide a method of adhesive attachment where the structural reinforcing components can be attached to the door panels with the use of adhesive systems which are not heat sensitive and therefore will not delaminate before curing in higher ambient temperature locations. Yet still another object of the present invention is to provide for structural reinforcing components including decorative pieces arranged according to aesthetic preference to the exterior and/or interior of the door panels.

Yet a further object of the present invention is to provide a method of attachment of structural reinforcing components to door panels using at least two adhesives for attachment. Still another is to provide a method of attachment where a quick setting adhesive is used to establish the initial position of the structural reinforcing components on the door panels, and a structural adhesive is used to provide a permanent bond between the door panels and structural reinforcing components. A further object of the present invention is for the quick setting adhesive to maintain the connection between the door panels and structural reinforcing components until the structural adhesive cures.

In general, the present invention contemplates an assembly method for attaching a component to a panel of the sectional door including the steps of fabricating a panel for the sectional door, preparing a component for attachment to the panel, dispensing a first adhesive on a surface where the panel and the component are to be joined, locating the panel and the component in a predetermined relative attachment position, and dispensing a second adhesive along at least one surface where the panel and the component abut.

Additionally, the present invention contemplates a sectional door according to the assembly method including a panel having at least one side with at least a portion being a substantially planar surface, a component having at least one engaging surface joined to the planar surface, a first adhesive interposed between the planar surface and the engaging surface, and a second adhesive disposed along an edge of the engaging surface and the planar surface, whereby the second adhesive effects a seal between the panel and the component and imparts structural strength of the component to the panel.

PREFERRED EMBODIMENT FOR CARRYING OUT THE INVENTION

Figure 1:
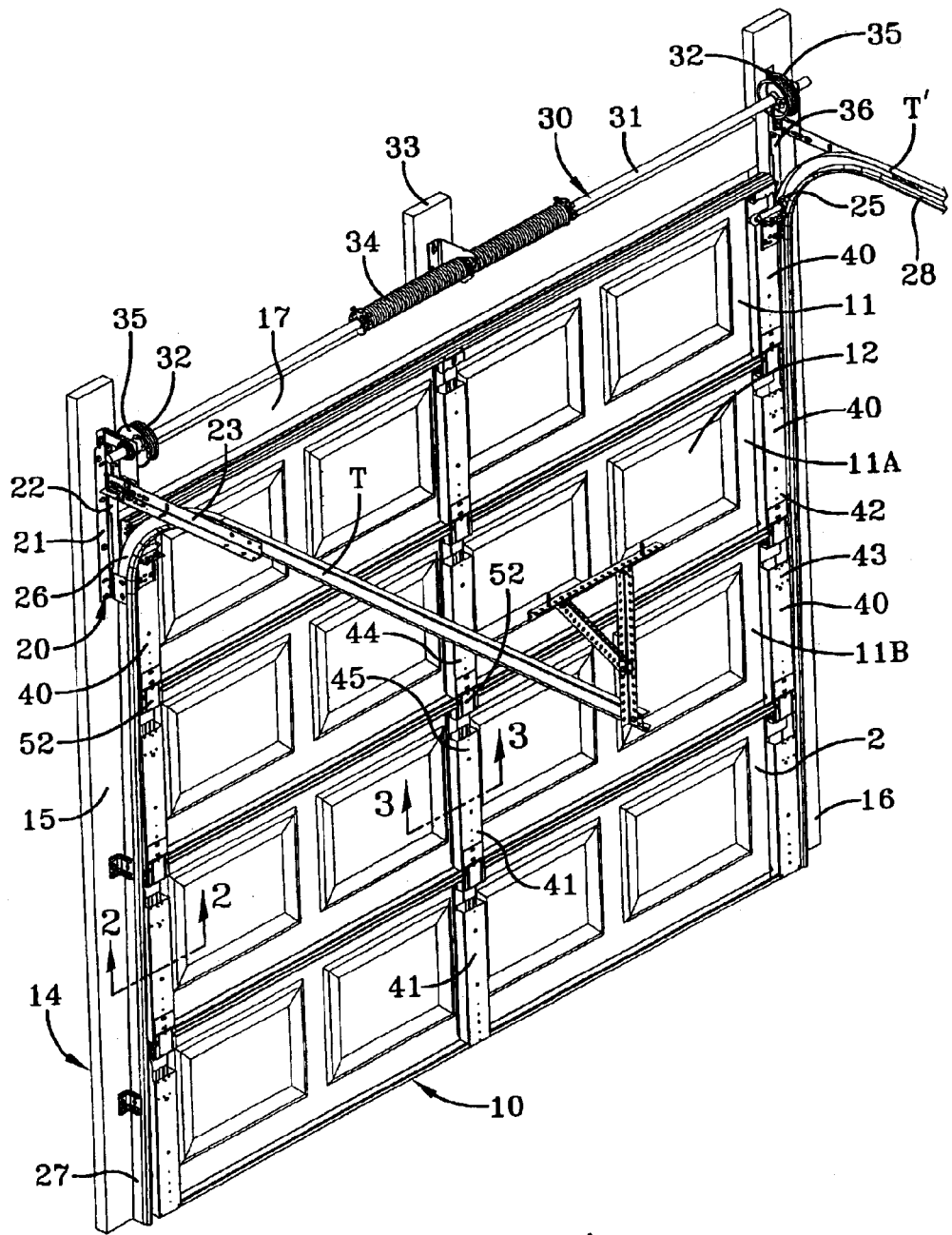
FIG. 1 is an interior perspective view of an upwardly acting sectional door made according to the concepts of the present invention with structural reinforcing components attached to the door panels.

A sectional door resulting from practice of the method of the present invention is generally indicated by numeral 10 in FIGS. 1–7. The door 10 is composed of a plurality of panels 11 for articulated movement between an open and closed position. The panels have interior surfaces 12 and exterior surfaces 13. Referring to FIG. 1 of the drawings, the opening in which the door 10 is positioned for opening and closing movements relative thereto is defined by a frame, generally indicated by the numeral 14, that consists of a pair of spaced jambs 15, 16 that, as seen in FIG. 1, are generally parallel and extend vertically upwardly from the floor or ground (not shown). The jambs 15, 16 are spaced and joined at their vertically upper extremity by a header 17 to thereby delineate a generally inverted U-shaped frame 14 around the opening of the door 10. The frame 14 is normally constructed of lumber, as is well known to persons skilled in the art, for the purposes of reinforcement and facilitating the attachment of components supporting and controlling door 10.

As seen in FIG. 1, affixed to the jambs 15, 16 proximate the upper extremities thereof and the lateral extremities of the header 17 to either side of the door 10 are flag angles, generally indicated by the numeral 20. The flag angles 20 generally consist of L-shaped members 21 having a leg 22 attached to underlying jambs 15, 16, and a projecting leg 23 preferably disposed substantially perpendicular to the leg 22 and, therefore, perpendicular to the jambs 15, 16.

The projecting legs 23 are positioned in supporting relation to tracks T, T' located to either side of door 10. The tracks T, T' provide a guide system for rollers 25 attached to the side of door panels 11 in a manner well known to persons skilled in the art. The projecting legs 23 normally extend substantially perpendicular to the jambs 15, 16 and may be attached to a transitional portion 26 of tracks T, T' between a vertical track section 27 and a horizontal track section 28 thereof or to horizontal section 28 of tracks T, T'. The tracks T, T' define the travel of the door 10 and articulation of panels 11 in moving upwardly from the closed to open position and downwardly from the open to closed position.

Still referring to FIG. 1 of the drawings, door 10 has a counterbalance system, generally indicated by the numeral 30. As shown, the counterbalance system 30 includes an elongate drive tube 31 extending between cable drum mechanisms 32 positioned proximate each of the flag angles 20. A coiled spring 34 for assisting the motion of the door 10 is disposed about drive tube 31, and supported by header extension 33 or header 17 in a manner that is well known in the art. The cable drum mechanisms 32 positioned on the drive tube 31 or a shaft proximate the ends thereof rotate with drive tube 31. The cable drum mechanisms 32 each have a cable 36 reeved thereabout which is affixed to the door 10, preferably proximate the bottom, such that rotation of the cable drum mechanisms 32 operates to open or close the door 10. The cable 36 is attached to cylindrical drum 35 of cable drum mechanism 32. It is to be appreciated that various other tracks and counterbalance systems may be employed in the practice of the present invention.

Affixed to the interior surface 12 of panels 11 are various structural reinforcing components. These reinforcing components include end caps or end stiles 40 and center stiles 41. The end stiles 40 and center stiles 41 reinforce panels 11 providing additional structural rigidity to the panels 11. As seen in FIG. 1, the end stiles 40 are vertically oriented along their longitudinal axis, and are positioned along both of the vertical edges or ends of the panels 11. The bottom extremity 42 of end stile 40 on upper middle panel 11A is positioned adjacent to the top extremity 43 of the end stile 40 on the lower middle panel 11B. The center stiles 41 are vertically oriented along their longitudinal axis, and are positioned along a vertical line dividing the panels 11 in half. Like the configuration of end stiles 40, the bottom extremity 44 of center stile 41 on upper middle panel 11A is positioned adjacent to the top extremity 45 of the center stile 41 on the lower middle panel 11B. Depending upon the length of the panels 11, two or more center stiles may be employed.

The top extremity 43 of end stile 40 has hinge pin receiving holes 50 and the top extremity 45 of center stile 41 has hinge pin receiving holes 51. Hook brackets 52 for receiving hinge pins (not shown) inserted in holes 50 and 51 are attached to the bottom extremities of 42 and 44 of the end stile 40 and center stile 41, respectively. The hook brackets 52 are disposed within cavity 53 near the top extremity 43 of end stile 40 and cavity 54 near the top extremity 45 of center stile 41. A hinge-like connection is formed by the interface of the hook brackets 52 and hinge pins inserted into hole 50 and 51 with cavities 53 and 54 allowing for proper articulation. Therefore, in addition to providing structural reinforcement, the hinge-like connection of hook brackets 52 and hinge pins afforded by the placement of the end stiles 40 and center stiles 41 allows the panels 11 to articulate with respect to each other when the door 10 is opening or closing.

Figure 2:
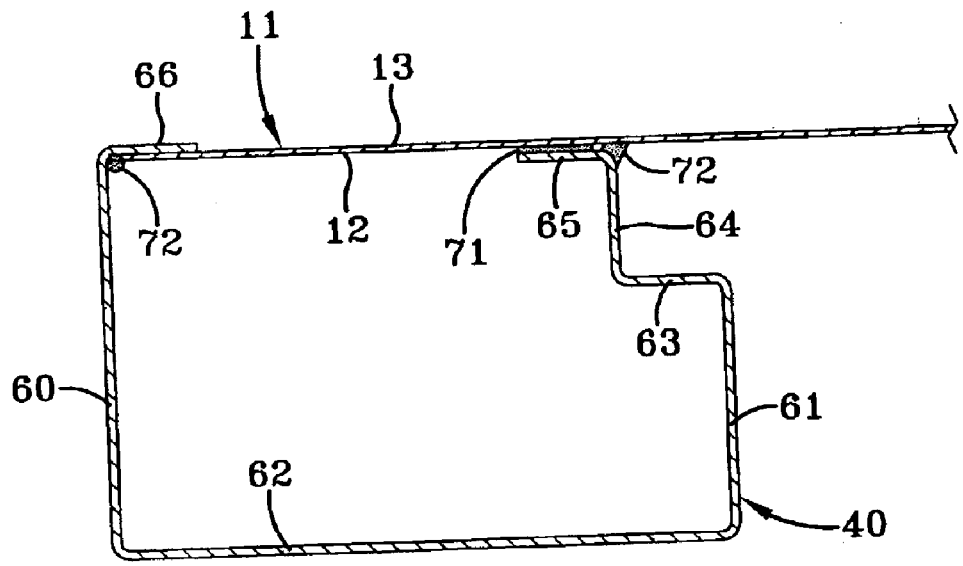
FIG. 2 is a sectional view through an end stile of a door panel taken substantially along the line 2—2 of FIG. 1.

Referring to FIG. 2, the cross-section of end stiles 40 is generally U-shaped. For example, end stiles 40 have opposing legs 60 and 61 joined by and extending perpendicularly from connecting leg 62. The opposing leg 61 terminates in an inset portion formed by inset legs 63 and 64. Inset leg 63 is generally parallel to connecting leg 62 and extends toward the center of end stile 40, whereas inset leg 64 extends from inset leg 63, and is generally parallel with opposing legs 60 and 61.

Extending from opposing leg 60 and inset leg 64 are lips 66 and 65, respectively. Lips 66 and 65 are generally parallel to connecting leg 62, and are configured to abut panel 11. However, it can be appreciated that the lips 66 and 65 can be provided with other orientations with respect to connecting leg 62 provided lips 66 and 65 remain substantially parallel to interior surface 12 of panel 11. The lip 66 is disposed farther from connecting leg 62 than lip 65 a distance approximating the thickness of panel 11 allowing the interior surface of lip 66 and the exterior surface of lip 65 to abut panel 11 along the longitudinal length of end stile 40. As a result, along the longitudinal length of end stile 40, lip 65 is in engagement with interior surface 12 and lip 66 wraps around the vertical edge of panel 11 and is in engagement with exterior surface 13.

To secure the end stiles 40 and panels 11 together, two adhesives are used along the length of contact of lips 65 and 66, and surfaces 12 and 13. A quick setting adhesive, indicated by the number 71, is used to position the center stiles with respect to the panel 11, and a structural adhesive, indicated by the number 72, is applied to provide rigid structural attachment between the end stile 40 and the panel 11.

The quick setting adhesive could be a polyethylene based resin with characteristics generally of a viscosity at 350° F. of 1275 CPS, a softening point (ASTM E-28 Ring and Ball) at 300° F., and a sheer adhesion failure temperature at 214° F. A preferred quick setting adhesive is manufactured by Bostik Findley, Inc., and is identified as H3185 Hot Melt Adhesive. The structural adhesive could be a polyurethane based resin with characteristics generally of a tack free time of 70 minutes, a curing time at 77° F. of 1.5 to 3.0 days, a hardness (Shore A) of 40 to 45, a modulus at 100% elongation of 65 psi, a tensile strength of 240 psi, an elongation of 850%, and a temperature resistance of −40° to 180° F. A preferred structural adhesive is manufactured by Bostik Findley, Inc., and is identified as 1100. Fast Set.

The quick setting adhesive 71 is applied between the interior surface 12 and lip 65 along the length of their eventual contact. The structural adhesive 72 is applied along the edge formed by the intersection of opposing leg 60 and lip 66. After application of these adhesives, the quick setting adhesive 71 maintains the connection between the panel 11 and the end stile 40 until the structural adhesive 72 cures. Another bead of structural adhesive is then applied along the edge between end stile 40 and panel 11 formed by the interface of lip 65 and interior surface 12 to increase structural strength and provide a weather seal. In addition, end stile 40 is provided with a plurality of engaging surfaces. Specifically, end stile 40 is perforated to form cut-out portions 73. These cut-out portions 73 are crimped against panel 11 to maintain the interface of lip 66 and surface 13. These cut-portions 73 can alternatively be used as a temporary way of maintaining the aforementioned interface until the structural adhesive 72 cures or be used as a permanent way of joining the end stile 40 and the panel 11. For example, to permanently join the end stile 40 and the panel 11, the cut-out portions 73 could be punch-formed or spot-welded to the panel 11.

Figure 3:
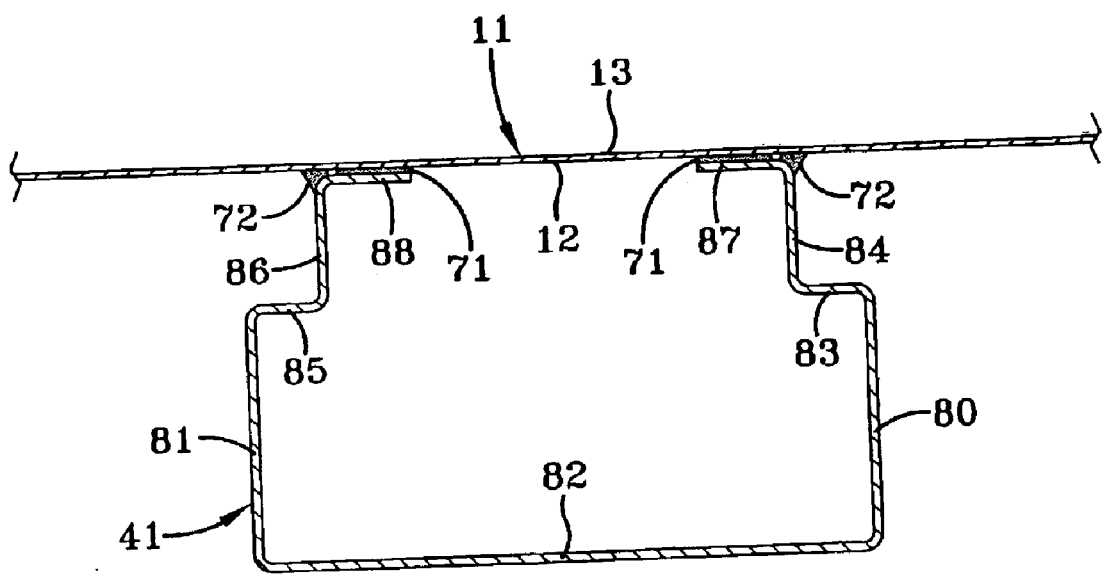
FIG. 3 is a sectional view of a center stile of a door panel taken substantially along the line 3—3 of FIG. 2.

Referring to FIG. 3, the cross-section of center stiles 41 are generally U-shaped. For example, center stiles 41 have opposing legs 80 and 81 joined by connecting leg 82. The opposing legs 80 and 81 extend perpendicularly from connecting leg 82 and terminate in inset portions formed by inset legs 83 and 84, and 85 and 86, respectively. Inset legs 83 and 85 are generally parallel to connecting leg 82 and extend toward the center of center stile 41 from opposing legs 80 and 81, whereas inset legs 84 and 86 extend perpendicularly from legs 83 and 85, and are generally parallel to opposing legs 80 and 81.

Extending from inset legs 84 and 86 are lips 87 and 88, respectively. Lips 87 and 88 are generally parallel to connecting leg 82, and are configured to abut interior surface 12 of panel 11. However, it can be appreciated that the lips 87 and 88 can be provided with other orientations with respect to connecting leg 82 provided lips 87 and 88 remain substantially parallel to interior surface 12. The surfaces of lips 87 and 88 facing interior surface 12 are meant to abut interior surface 12 along the longitudinal length of center stile 41.

To secure the center stiles 41 and panels 11 together, two adhesives as discussed hereinabove are used along the length of abutment lips 87 and 88, and interior surface 12 of panel 11. A quick setting adhesive 71 is first used to position the center stiles 41 with respect to the panels 11, and a structural adhesive 72 is then applied to provide rigid structural attachment and a weather seal between center stile 41 and interior surface 12 of panel 11. The quick setting adhesive 71 is applied between the interior surface 12 and lips 87 and 88 along the eventual length of their abutment. The structural adhesive 72 is then applied along the edges formed between the center stile 41 and panel 11 by the interface of lips 87 and 88, and interior surface 12.

Figure 4:
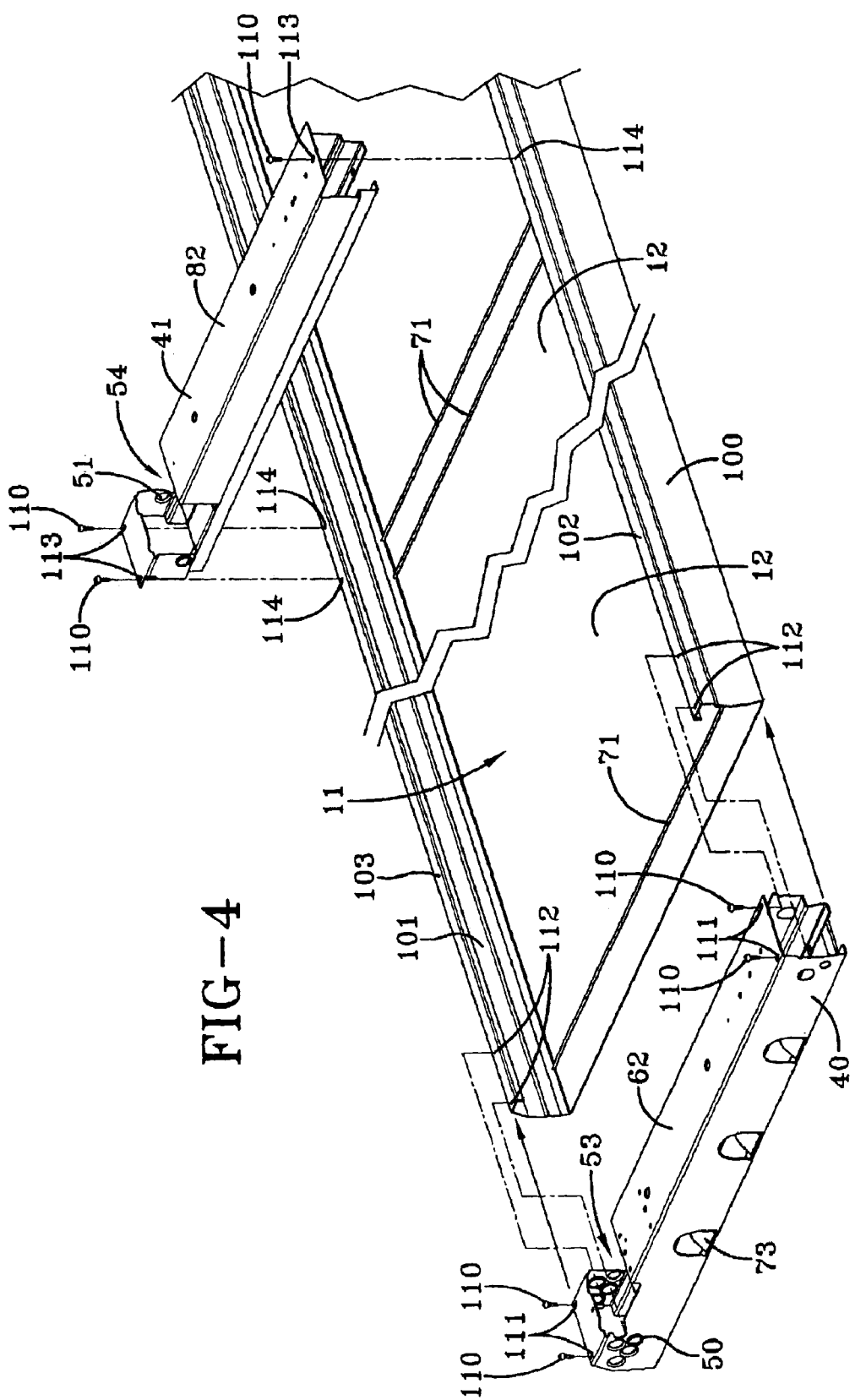
FIG. 4 is an exploded view showing placement of the end cap and center stile on a door panel with the quick setting adhesive applied to the door facer.
Figure 5:
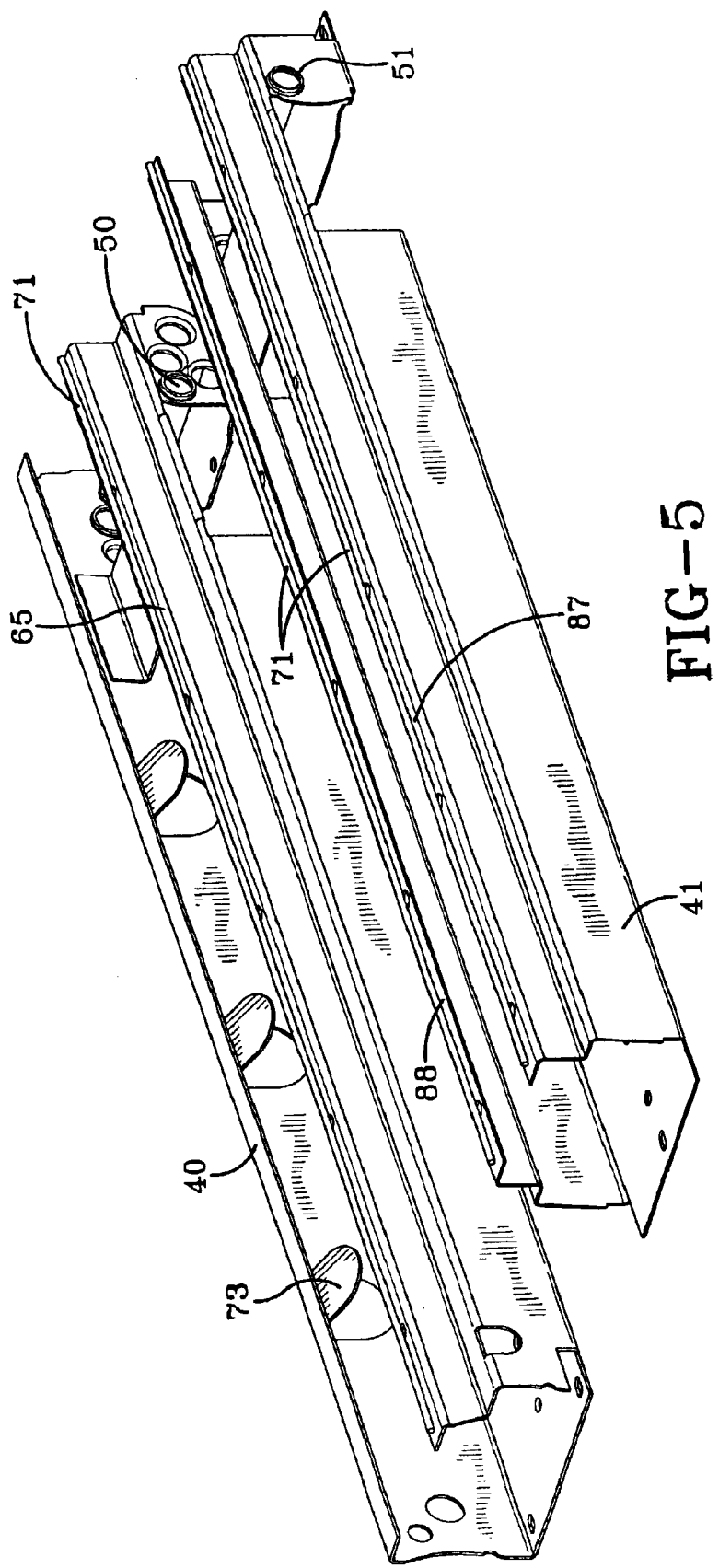
FIG. 5 is an enlarged perspective view of the end stile and center stile showing placement of the quick setting adhesive on the stiles.

Referring to FIGS. 4 and 5, the quick setting adhesive 71 can be applied in either of two ways to the secure the end stiles 40 and center stiles 41 to the panel 11. For example, the quick setting adhesive 71 could be applied to the longitudinal lengths of lip 65 of end stile 40, and lips 87 and 88 of center stile 41, as seen in FIG. 5. Alternatively, the quick setting adhesive 71 could be applied to the interior surface 12 of panel 11 where the lips 65, 87, and 88 would ultimately abut interior surface 12, as seen in FIG. 4. Once the end stiles 40 and center stiles 41 are held in position on panel 11 by the quick setting adhesive 71, the structural adhesive 72 can be applied along the edges formed by the panel 11 with the end stile 40 and center stile 41 to form a seal between the panel 11 and the end stile 40 and center stile 41.

The application of the quick setting adhesive 71 to either the lips 65, 87, and 88, or to the panel 11 depends on the thickness of the materials used is those elements. It is preferable to apply the quick setting adhesive 71 to the thinner of those elements. The thinner elements are easier to keep warm thereby allowing the quick setting adhesive 71 to flow. Furthermore, the thicker elements, when brought into abutment with the thinner elements, can be used to assist in cooling and setting the quick setting adhesive 71 more rapidly. Therefore, depending on the thickness of the lips 65, 87, and 88, and the panels 11, either of the alternative methods for applying the quick setting adhesive 71 could be selected depending upon characteristics of the components. Moreover, the speed of the assembly line can be adjusted by varying the temperature of the quick setting adhesive 71 and the lips 65, 87, 88, or panels 11. For example, to allow the assembly line to move at a relatively slow speed, the temperature of the quick setting adhesive 71 and those elements would be increased, thus permitting time for proper alignment of those elements before the quick setting adhesive 71 cures. To allow the assembly line to move at a relatively fast speed, the temperature of the quick setting adhesive 71 and those elements would be decreased, thus allowing the quick setting adhesive 72 to cure more quickly.

Figure 6:
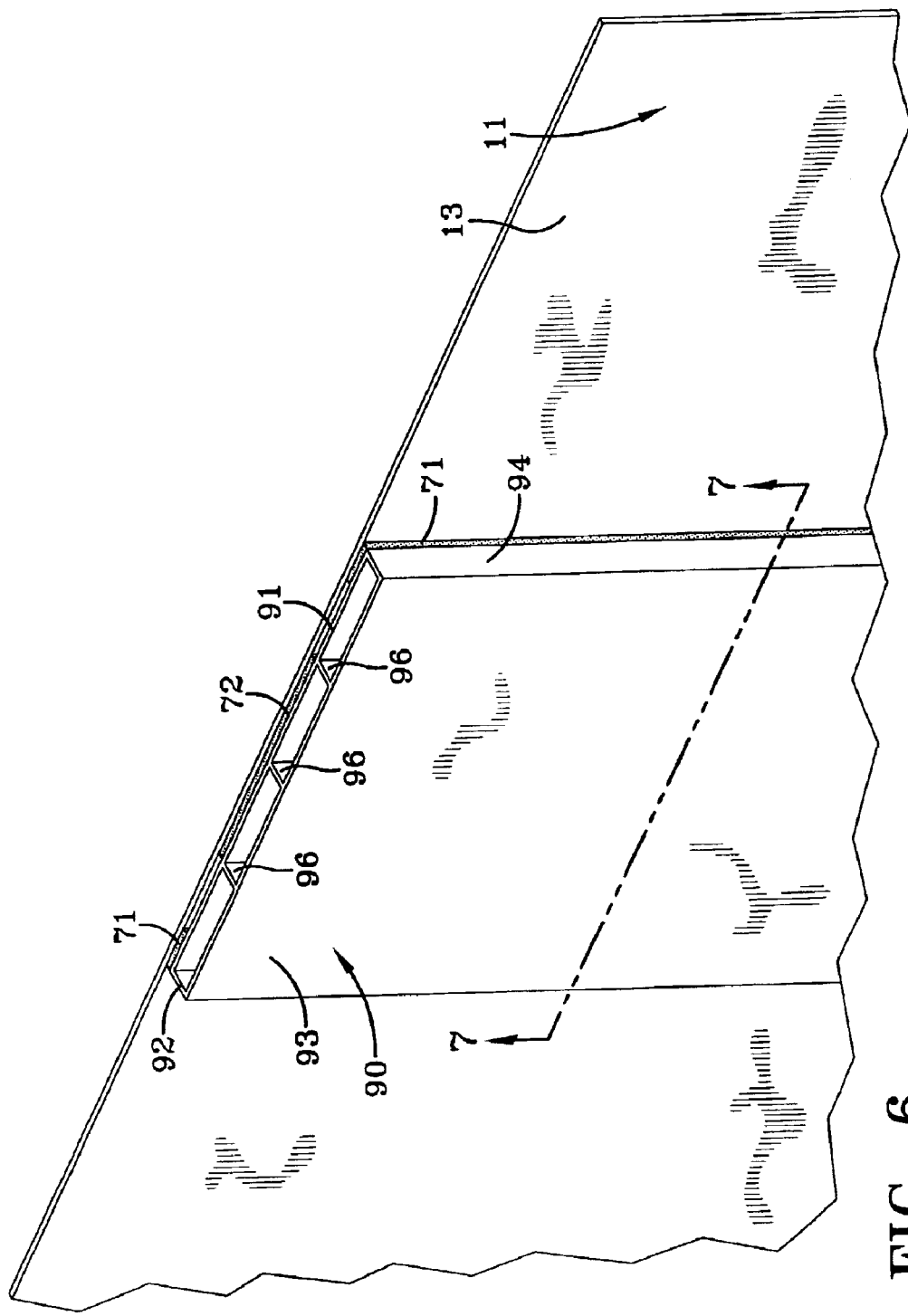
FIG. 6 is an exterior perspective view of a decorative piece attached to the exterior of the door panel.
Figure 7:
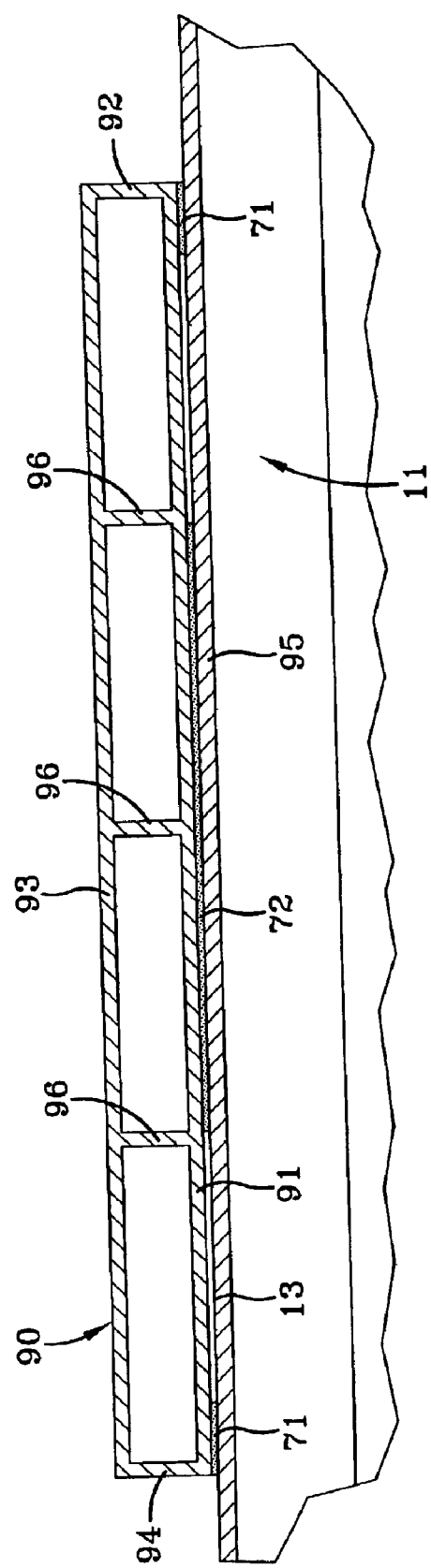
FIG. 7 is a sectional view taken substantially along line 7—7 of FIG. 6 showing details of the attachment of a decorative piece to a door panel.

Referring to FIGS. 6 and 7, decorative pieces 90 may be attached to portions of the exterior surface 13 of the door panel 11. In addition to the end stiles 40 and center stiles 41, these decorative pieces 90 add structural rigidity to the door panels 11. These decorative pieces 90 can be aligned vertically or otherwise, and can be variously joined and spaced all according to aesthetic preference. With reference to FIG. 7, the perimeter of the exemplary decorative piece 90 is generally rectangular, defined by sides 91, 92, 93, and 94. Side 91 is in substantial abutment with the exterior surface 13 of panel 11. A plurality of spaced ribs 96 generally parallel with sides 92 and 94 may be provided inside the perimeter defined by sides 91, 92, 93, and 94 for reinforcing decorative piece 90. Alternatively, decorative piece 90 may be of a solid construction.

The decorative pieces 90 are attached to panel 11 with the use of quick setting adhesive 71 and structural adhesive 72. As seen in FIG. 7, both the quick setting adhesive 71 and the structural adhesive 72 are spread between the exterior surface 13 and side 91 along their length of abutment. The structural adhesive 72 is spread at the intermediate portion of the interface, and the structural adhesive 71 is spread at the peripheries of the interface. Because the quick setting adhesive 71 has a higher viscosity than the structural adhesive 72 and cures quickly, the quick setting adhesive 71 effectively traps the structural adhesive 72 between the exterior surface 13 and decorative pieces 90.

When affixing the decorative pieces 90 to the exterior surface 13 of door panels 11, the structural adhesive 72 would be applied first. The structural adhesive 72 could alternatively be applied to either the exterior surface 13 or the decorative pieces 11 before the quick setting adhesive 71 is applied. However, unlike the application of the quick setting adhesive 71 to the end stiles 40, center stiles 41, and interior surface 12, there is no variation in applying the quick setting adhesive 71 to affix the decorative pieces 90 to the door panels 11. The quick setting adhesive 71 will always be applied after the structural adhesive 72 in order to trap the structural adhesive 72 between the decorative piece 90 and the exterior surface 13.

After proper application, the decorative pieces 90 are affixed to the exterior surface 13, and the end stiles 40 and center stiles 41 are affixed to the interior surface 12. As seen in FIG. 4, the end stiles 40 and center stiles 41 ultimately reside between opposing rails 100 and 101 of panel 11. The rails 100 and 101 extend perpendicularly from interior surface 12 of panel 11, and terminate in return legs 102 and 103, respectively. However, because thinner gauge metals may be used for the panels 11, the panels 11 have a tendency to "rack," or axially deform. Such racking could destroy the proper alignment of the end stile 40 and center stiles 41 with respect to the panel 11. Therefore, to prevent the panel 11 from racking, fasteners 110 are provided through holes 111 in end stile 40 and inserted in matching holes 112 in return legs 102 and 103, and fasteners 110 are provided through holes 113 in center stile 41 and inserted in matching holes 114 in return legs 102 and 103.

Figure 8:
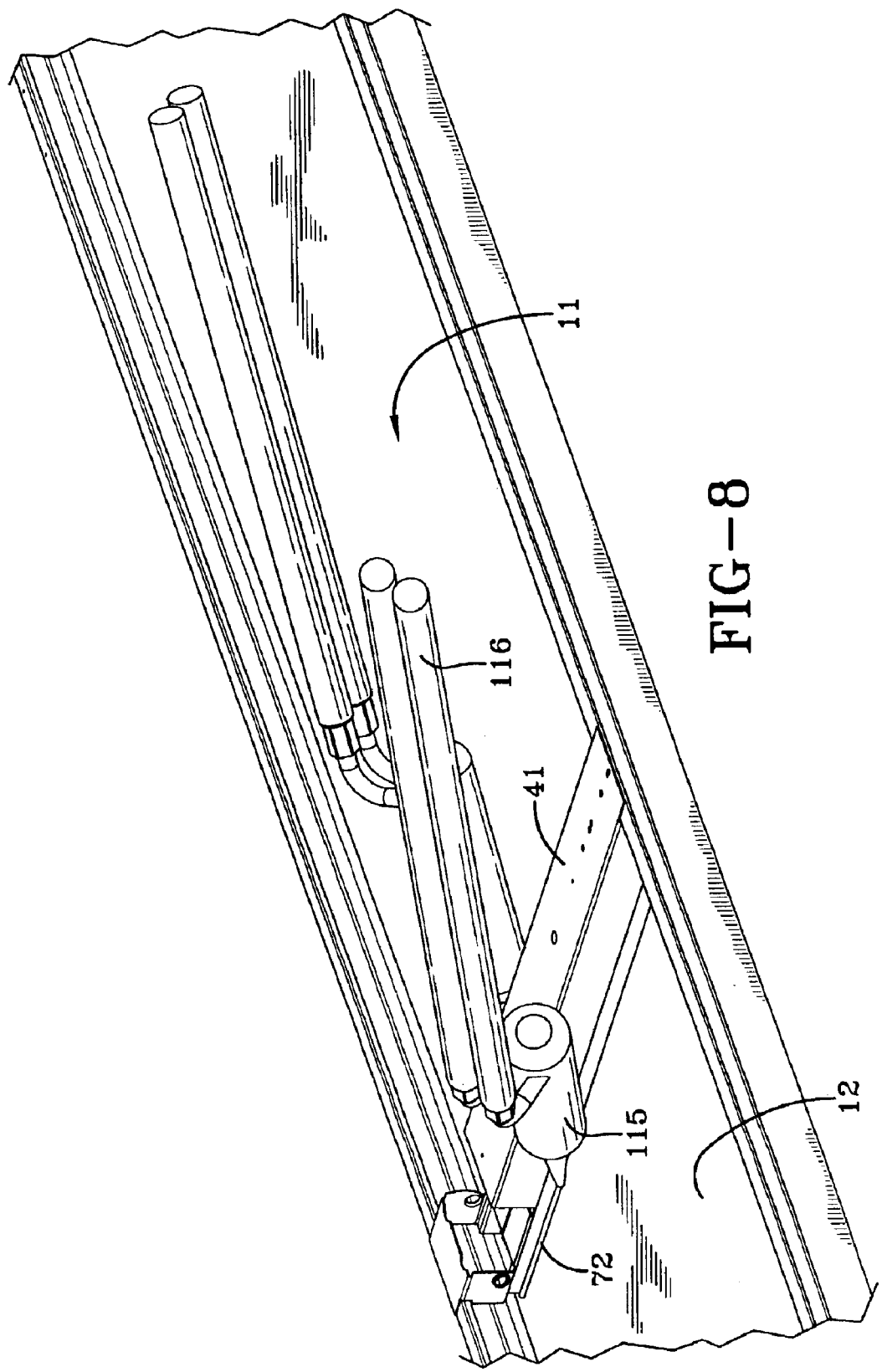
FIG. 8 is a perspective view of exemplary automated application mechanism which might be used to apply the structural adhesive to the center stile.

Referring to FIG. 8, an exemplary automatic glue gun 115 attached to a robotic arm 116 is depicted. The glue gun 115 may be used to dispense structural adhesive 72 along the niches created by the interfaces of interior surface 12 and lips 87 and 88 of center stile 41. In addition, the automatic glue gun 115 can be used to dispense the quick setting adhesive 71 on the end stiles 40, center stiles 41, and interior surface 12.

Because the quick setting adhesive 71 is applied to maintain the connection between the end stile 40, center stile 41, and interior surface 12, and between the decorative pieces 90 and exterior surface 13, the panels 11 can be handled roughly, shipped and installed soon after assembly. The quick setting adhesive 71 advantageously maintains the interface between the interior surface 12 and exterior surface 13 and those structural reinforcing components while the structural adhesive 72 cures.

Thus, it should be evident that the sectional door panel and the method for manufacturing the door panel disclosed herein carries out one or more of the objects of the present invention set forth above and otherwise constitutes an advantageous contribution to the art. As will be apparent to persons skilled in the art, modifications can be made to the preferred embodiments disclosed herein without departing from the spirit of the invention, the scope of the invention herein being limited solely by the scope of the attached claims.

What is claimed is:

1. An assembly method for attaching a component to a panel for a sectional door, comprising steps of: fabricating a panel for the sectional door, preparing a component for attachment to said panel, dispensing a first adhesive on a surface where said panel and said component are to be joined, locating said panel and said component in a predetermined relative attachment position, wherein said first adhesive is a flowable and relatively quick setting adhesive to temporarily maintain the predetermined relative attachment position, and dispensing a second adhesive along at least one surface where said panel and said component abut, wherein said second adhesive is a flowable structural adhesive for structurally bonding said panel and said component, thereby strengthening said panel.

2. An assembly method according to claim 1, including the step of selectively dispensing said first adhesive on one of said panel and said component.

3. An assembly method according to claim 1, including the step of determining the thinner material of said panel and said component to receive the dispensing of said first adhesive.

4. An assembly method according to claim 1, wherein said component is fabricated to the configuration of either of an end stile or a center stile.

5. An assembly method according to claim 1, wherein said stiles are elongate members having a generally U-shaped cross-section defined by a connecting leg coupling opposed legs having projection lips generally paralleling said connecting leg.

6. An assembly method according to claim 1, wherein said component is a decorative piece fabricated with a rectangular cross-section.

7. A method of manufacturing a reinforced sectional door panel comprising the steps of, constructing a panel having a side with a portion being a substantially planar panel surface, constructing a component having at least one substantially planar engaging surface, dispensing a first adhesive on one of said panel surface and said engaging surface where said component and said panel are to be joined, locating said panel surface and said engaging surface in position where said component and said panel are to be joined with said first adhesive interposed therebetween, said first adhesive being a flowable and relatively quick setting adhesive, and dispensing a second adhesive abutting an edge of said engaging surface and panel surface, whereby said second adhesive effects a seal between said component and said panel and makes said component integral with said panel, said second adhesive being a flowable structural adhesive.

8. A method according to claim 7, including the step of applying the first adhesive to the thinner material of said panel and said component.

* * * * *